United States Patent
Fleming et al.

(10) Patent No.: US 9,937,879 B2
(45) Date of Patent: *Apr. 10, 2018

(54) HIGH CONTRAST RETROREFLECTIVE SHEETING AND LICENSE PLATES

(71) Applicant: 3M INNOVATIVE PROPERTIES COMPANY, St. Paul, MN (US)

(72) Inventors: Patrick R. Fleming, Lake Elmo, MN (US); Thomas J. Dahlin, St. Louis Park, MN (US); Thomas V. Kusilek, River Falls, WI (US); Robert L. Smithson, Mathomedi, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/830,421

(22) Filed: Aug. 19, 2015

(65) Prior Publication Data

US 2015/0353029 A1 Dec. 10, 2015

Related U.S. Application Data

(62) Division of application No. 13/500,585, filed as application No. PCT/US2010/051507 on Oct. 5, 2010, now Pat. No. 9,145,098.

(60) Provisional application No. 61/249,765, filed on Oct. 8, 2009.

(51) Int. Cl.
| | | |
|---|---|---|
| *G02B 5/124* | (2006.01) | |
| *B60R 13/10* | (2006.01) | |
| *G09F 13/16* | (2006.01) | |
| *G06K 9/32* | (2006.01) | |
| *G06K 9/18* | (2006.01) | |
| *G02B 5/12* | (2006.01) | |

(52) U.S. Cl.
CPC .............. *B60R 13/10* (2013.01); *G02B 5/12* (2013.01); *G06K 9/18* (2013.01); *G06K 9/325* (2013.01); *G09F 13/16* (2013.01); *Y10T 428/24355* (2015.01); *Y10T 428/24802* (2015.01)

(58) Field of Classification Search
CPC .......... G02B 5/12; G02B 5/122; G02B 5/124; G06K 9/325; G09F 13/16; Y10T 428/24355
USPC .................................. 359/530–533
See application file for complete search history.

(56) References Cited

U.S. PATENT DOCUMENTS

| | | |
|---|---|---|
| 3,758,193 A | 9/1973 | Tung |
| 3,917,232 A | 11/1975 | Lindner |
| 4,268,179 A | 5/1981 | Long |
| 4,368,979 A | 1/1983 | Ruell |
| 4,491,923 A | 1/1985 | Look |
| 4,605,946 A | 8/1986 | Robinson, Jr. |

(Continued)

FOREIGN PATENT DOCUMENTS

| | | |
|---|---|---|
| EP | 0416742 | 3/1991 |
| WO | WO 2008-007076 | 1/2008 |
| WO | WO 2009-118534 | 10/2009 |

*Primary Examiner* — James Phan

(57) ABSTRACT

The present disclosure relates to the formation of high contrast, wavelength independent retroreflective sheeting made by including a light scattering material on at least a portion of the retroreflective sheeting. The light scattering material reduces the brightness of the retroreflective sheeting without substantially changing the appearance of the retroreflective sheeting when viewed under scattered light.

8 Claims, 3 Drawing Sheets

(56) References Cited

U.S. PATENT DOCUMENTS

| | | | |
|---|---|---|---|
| 4,792,258 A | 12/1988 | Goff | |
| 5,029,023 A | 7/1991 | Bearden | |
| 5,585,616 A | 12/1996 | Roxby | |
| 5,656,360 A | 8/1997 | Faykish | |
| 5,672,381 A | 9/1997 | Rajan | |
| 5,760,384 A | 6/1998 | Itoh | |
| 5,915,032 A | 6/1999 | Look | |
| 5,940,212 A * | 8/1999 | Johnson | G02B 5/124 359/529 |
| 6,024,455 A | 2/2000 | O'Neill | |
| 6,120,636 A | 9/2000 | Nilsen | |
| 6,448,889 B1 | 9/2002 | Hudson | |
| 6,650,765 B1 | 11/2003 | Alves | |
| 6,832,728 B2 | 12/2004 | Kennedy | |
| 7,198,426 B2 | 4/2007 | Kang | |
| 7,258,505 B2 | 8/2007 | Dehart | |
| 7,329,447 B2 | 2/2008 | Chirhart | |
| 7,350,328 B1 | 4/2008 | Garcia | |
| 7,351,008 B2 | 4/2008 | Yodock, III | |
| 7,387,393 B2 | 6/2008 | Reich | |
| 9,145,098 B2 * | 9/2015 | Fleming | B60R 13/10 |
| 2002/0030112 A1 | 3/2002 | Schreiber | |
| 2002/0044069 A1 | 4/2002 | Jenkinson | |
| 2002/0178627 A1 | 12/2002 | Tietze et al. | |
| 2003/0133594 A1 | 7/2003 | Sefton | |
| 2004/0089727 A1 | 5/2004 | Baharav et al. | |
| 2005/0161505 A1 | 7/2005 | Yin | |
| 2005/0173524 A1 | 8/2005 | Schrader | |
| 2007/0069921 A1 | 3/2007 | Sefton | |
| 2007/0139775 A1 | 6/2007 | Reich | |
| 2008/0001046 A1 | 1/2008 | Mettler | |
| 2009/0097034 A1 | 4/2009 | Grygier et al. | |
| 2009/0267895 A1 | 10/2009 | Bunch | |
| 2010/0151213 A1 | 6/2010 | Smithson et al. | |
| 2011/0084126 A1 | 4/2011 | Fleming | |
| 2012/0281285 A1 | 11/2012 | Orensteen et al. | |

* cited by examiner

HIGH CONTRAST RETROREFLECTIVE SHEETING AND LICENSE PLATES

TECHNICAL FIELD

The present disclosure generally relates to high contrast retroreflective sheeting and license plates, methods of making the high contrast retroreflective sheeting and license plates, and automated license plate reader systems capable of reading the high contrast retroreflective sheeting and license plates.

BACKGROUND

Automatic Vehicle Recognition (AVR) is a term applied to the detection and recognition of a vehicle by an electronic system. Exemplary uses for AVR include, for example, automatic tolling, traffic law enforcement, searching for vehicles associated with crimes, and facility access control. Ideal AVR systems are universal (i.e., they are able to read all license plates with 100% accuracy). The two main types of AVR systems in use today are (1) systems using RFID technology to read an RFID tag attached to a vehicle and (2) systems using a machine or device to read a machine-readable code attached to a vehicle.

One advantage of RFID systems is their high accuracy, which is achieved by virtue of error detection and correction information contained on the RFID tag. Using well known mathematical techniques (cyclic redundancy check, or CRC, for example), the probability that a read is accurate (or the inverse) can be determined. However, RFID systems have some disadvantages, including that not all vehicles include RFID tags. Also, existing unpowered "passive" RFID tag readers may have difficulty pinpointing the exact location of an object. Rather, they simply report the presence or absence of a tag in their field of sensitivity. Moreover, many RFID tag readers only operate at short range, function poorly in the presence of metal, and are blocked by interference when many tagged objects are present. Some of these problems can be overcome by using active RFID technology or similar methods. However, these techniques require expensive, power-consuming electronics and batteries, and they still may not determine position accurately when attached to dense or metallic objects.

Machine vision systems (often called Automated License Plate Readers or ALPR systems) use a machine or device to read a machine-readable code attached to a vehicle. In many embodiments, the machine readable code is attached to, printed on, or adjacent to a license plate. One exemplary ALPR system is shown schematically in FIG. 1, which illustrates the process of illuminating and viewing a retroreflective tag. The term "retroreflective" as used herein refers to the attribute of reflecting an obliquely incident light ray in a direction antiparallel to its incident direction, or nearly so, such that it returns to the light source or the immediate vicinity thereof. An infra-red light source 106 illuminates a retroreflective tag 102, which is located on a license plate 104. Retroreflective tag 102 reflects the infra-red light emitted by light source 106 straight back to the infra-red light source 106, where it is captured by an infra-red sensor 108, such as, for example, an infra-red camera. One advantage of ALPR systems is that they are can be used almost universally, since almost all areas of the world require that vehicles have license plates with visually identifiable information thereon. However, the task of recognizing visual tags can be complicated. For example, the read accuracy from an ALPR system is largely dependent on the quality of the captured image as assessed by the reader. Existing systems have difficulty distinguishing tags from complex backgrounds and handling variable lighting. Further, the accuracy of ALPR systems suffers when license plates are obscured or dirty.

Prior art methods of creating high contrast license plates for use in ALPR systems involve including materials that absorb in the infra-red wavelength range and transmit in the visible wavelength range. For example, U.S. Pat. No. 6,832,728 describes license plates including visible transmissive, infra-red opaque indicia. U.S. Pat. No. 7,387,393 describes license plates including infra-red blocking materials that create contrast on the license plate. U.S. Pat. No. 3,758,193 describes infra-red transmissive, visible absorptive materials for use on retroreflective sheeting.

SUMMARY

The present inventors recognized the need for retroreflective sheeting having high contrast in the infra-red wavelength range while maintaining the color characteristics of the retroreflective sheeting in the visible wavelength range. The present inventors also recognized the need for wavelength independent, high contrast retroreflective sheeting. The present inventors also recognized the need for license plates including such sheeting and OCR and/or ALPR systems capable of detecting such license plates.

The present inventors recognized that high contrast, wavelength independent retroreflective sheeting could be made by including a light scattering material on at least a portion of the retroreflective sheeting. The light scattering material reduces the brightness of the retroreflective sheeting without substantially changing the appearance of the retroreflective sheeting when viewed under scattered light.

Some preferred embodiments of the present disclosure relate to retroreflective sheeting, comprising: indicia including a light scattering material. Other preferred embodiments of the present disclosure relate to a license plate comprising the retroreflective sheeting described above. Other preferred embodiments of the present disclosure relate an optical character recognition system, comprising: an optical character recognition camera; a light source emitting infra-red light that is coaxial with the optical character recognition camera; and a license plate including the retroreflective sheeting described above.

DETAILED DESCRIPTION

The systems, methods, and apparatuses of the present disclosure generally describe the inclusion of a light scattering material on at least a portion of retroreflective sheeting. The light scattering material reduces the brightness of the retroreflective sheeting without substantially changing the appearance of the retroreflective sheeting when viewed under scattered light, thereby creating a high contrast, wavelength independent, retroreflective sheeting. Although existing license plates have included infra-red absorbing, blocking, opaque, and transmissive materials, none of have included light scattering materials to create high contrast. The use of light scattering materials has certain advantages over existing infra-red absorbing, blocking, opaque, and transmissive materials. For example, the contrast of a license plate including light scattering material is wavelength independent in that the indicia formed using light scattering materials has high contrast in retroreflection but a license plate viewed under normal (scattering) lighting conditions will still have whatever aesthetically pleasing look that is desired. This wavelength independence permits greater flexibility in the choice of a camera for use in an OCR or ALPR system that reads license plates including light scattering materials. Further, while it is difficult and expensive to find materials that absorb infra-red light but show color in visible, scattered light, it is relatively easy and inexpensive to find materials that scatter infra-red light without substantially changing the appearance of the retroreflective sheeting when viewed under scattered light.

The light scattering material is preferably used to create indicia on the retroreflective sheeting or license plate. Exemplary indicia include, for example, the license plate number or identifier. The light scattering material can be a surface-scattering material or can be a bulk-scattering material. Where a bulk-scattering material is used, it can be included in the indicia ink or can be placed under the indicia ink. If the light scattering material is placed under the indicia ink, it is preferably the same color as the substrate (e.g., retroreflective sheeting) so that it does not change the appearance of the indicia in scattered light. Exemplary infra-red light scattering materials include, for example, inks, toners, dyes, and tapes. Where inks, toners, or dyes are used, they are preferably flat (rather than glossy) since glossy inks, toners, and dyes may not adequately scatter the infra-red light. Alternatively, the license plate can simply be selectively roughed by, for example, sanding or bead blasting, in the areas that are meant to be light scattering. In such implementations, the top surface of the license plate acts as the light scattering material.

Some exemplary embodiments of a license plate onto which has been printed a light scattering material are shown in FIGS. 2A-4B.

Figure 1:
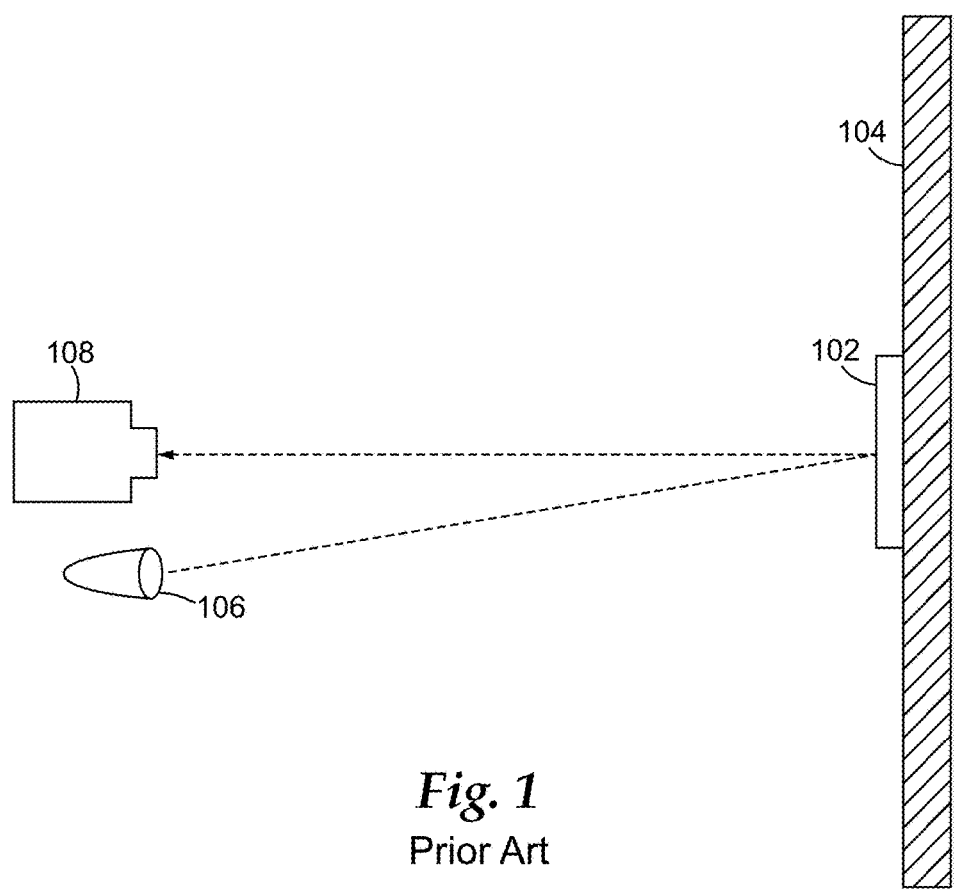
FIG. 1 is a schematic of a prior art ALPR system.
Figure 2A:
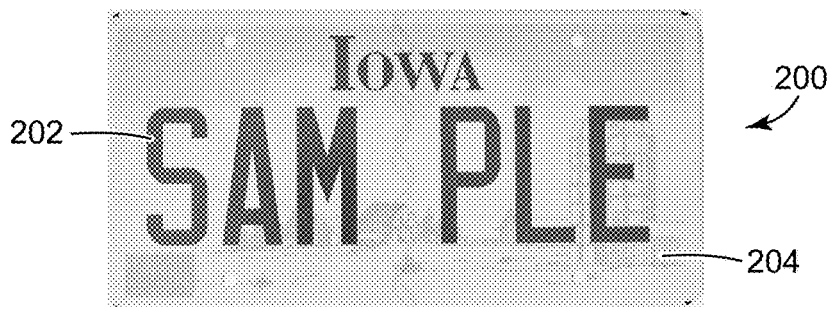
FIG. 2A is a photograph of a license plate viewed in diffuse visible light.
Figure 2B:
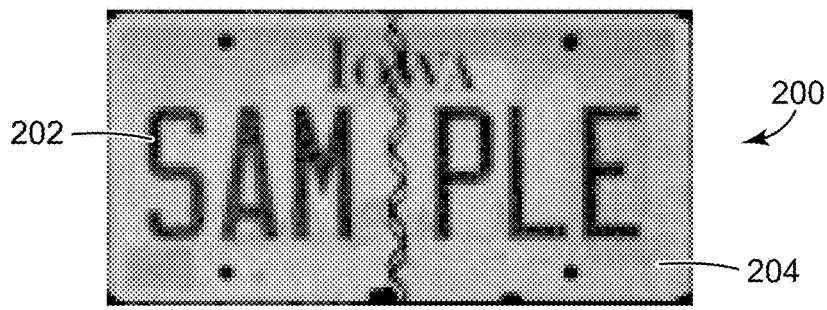
FIG. 2B is a photograph of the license plate of FIG. 2A viewed in retroreflected infra-red light.

FIG. 2A is a photograph of a prior art Iowa license plate 200 viewed in visible light. License plate 200 includes indicia 202 ("SAM PLE") that are visible to the human eye in scattered, visible light. Indicia 202 were printed on retroreflective sheeting 204 using a Digital License Plate thermal ribbon license plate printer (sold by 3M Company) using a colored ink (in this instance, TTR1301 Dark Blue (sold by 3M Company)). This yields a 2.25:1 contrast ratio under diffuse lighting conditions. FIG. 2B is a photograph of the license plate of FIG. 2A under retroreflected, infra-red light.

Figure 3A:
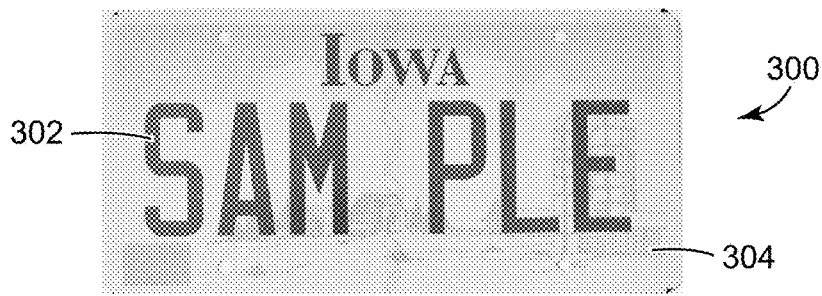
FIG. 3A is a photograph of a license plate viewed in diffuse visible light.
Figure 3B:
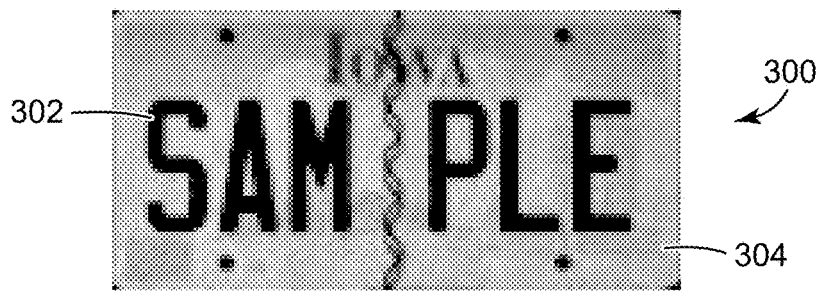
FIG. 3B is a photograph of the license plate of FIG. 3A viewed in retroreflected infra-red light.

FIG. 3A is a photograph of an Iowa license plate 300 when viewed in diffuse visible light. License plate 300 includes indicia 302 ("SAM PLE") printed with a light scattering material. Specifically, indicia 302 were printed using a Digital License Plate thermal ribbon license plate printer (sold by 3M). First, a light scattering white ink (for example, DPL Thermal Transfer Ribbon, TTR1321 in White, available from 3M Company) was printed on retroreflective sheeting 304. Next, a colored ink (in this instance, DLP Thermal Transfer Ribbon TTR1301 in Dark Blue, available from 3M Company) was printed over the light scattering white ink. Indicia 302 are visible to the human eye in diffuse visible light. FIG. 3B is a photograph of the license plate of FIG. 3A under retroreflected, infra-red light. White ink will scatter infra-red light so that indicia 302 look black when viewed in retroreflected lighting conditions. One immediately notices the high contrast (about 20:1) between indicia 302 and retroreflective sheeting 304 when the license plate is viewed under retroreflected, infra-red light. Further, this contrast is significantly greater than the contrast evident in the prior art license plates. Increased contrast results in higher license plate read-rate accuracy when the license plates are read by an ALPR system.

The contrast of a digital image is the grey value of the appropriately selected light areas in a ratio to the grey value of the appropriately selected dark areas. The contrast of an object is theoretically the same as the contrast of an image of that object. However the lighting conditions need to be specified and the exposure needs to be carefully controlled. The light areas must not saturate the detector and the dark areas must be sufficiently above the noise level that the noise does not substantially affect the measurement. For these reasons, it is difficult (sometimes impossible) to measure the contrast of high contrast objects from a single image. An 8 bit camera can theoretically measure a contrast of up to 256:1. However, if the noise level is about 10 counts, one would prefer to use a minimum measurement of about 30 counts. In order to avoid saturation of the image, one would prefer to use a maximum of about 200 counts. This limits the maximum contrast from a single image to 200/30 or about 6.7:1. In order to overcome these problems, one can use several images at different, carefully controlled lighting and exposure settings to extend the dynamic rage of the measurement.

Figure 4A:
FIG. 4A is a photograph of a license plate viewed in diffuse visible light.
Figure 4B:
FIG. 4B is a photograph of the license plate of FIG. 4A viewed in retroreflected infra-red light.

FIG. 4A is a photograph of a Minnesota license plate 400 when viewed in diffuse visible light. License plate 400 includes indicia 402 ("123 ABC") and a registration sticker 404 located in the lower right-hand corner of license plate 400. Registration sticker 404 includes a light scattering material. Specifically, registration sticker 404 includes (1) machine-readable information in the form of a bar code that is visible in retroreflected infra-red light (methods of forming such a bar code are described in greater detail in, for example, U.S. Patent Application Ser. No. 61/249,752, filed Oct. 8, 2009 and U.S. Patent Publication No. 2011/0084126, filed Oct. 8, 2009); (2) a colored ink (in this instance, a red Sharpie™ permanent marker) was used to form the number "10" on the registration sticker which is visible the naked human eye in scattered, visible light; and (3) pieces of clear, Scotch® brand tape (a light scattering material) were placed over the registration sticker to form a 2D bar code. FIG. 4B is a photograph of the license plate of FIG. 4A when viewed in retroreflected infra-red light. The license plate and registration sticker maintain all of their present functions of conveying information to the human reader when viewed under normal (diffuse) lighting conditions and, in addition, digital information is available to a bar code reader when viewed under retroreflective lighting conditions.

Some preferred embodiments of the present disclosure also describe OCR and/or ALPR systems capable of detecting the retroreflective sheeting and license plates described above. One exemplary OCR or ALPR system could include an OCR camera (e.g., Model 832, Spike™ sold by PIPS Technology, a division of Federal Signal Company); an infra-red light source; and a license plate as described above.

The light source preferably emits light that is nearly coaxial with the viewer of the OCR camera.

The recitation of all numerical ranges by endpoint is meant to include all numbers subsumed within the range (i.e., the range 1 to 10 includes, for example, 1, 1.5, 3.33, and 10).

Those having skill in the art will appreciate that many changes may be made to the details of the above-described embodiments and implementations without departing from the underlying principles thereof. Further, various modifications and alterations of the present invention will become apparent to those skilled in the art without departing from the spirit and scope of the invention. The scope of the present application should, therefore, be determined only by the following claims.

What is claimed is:

1. A retroreflective article comprising:
a retroreflective sheeting comprising indicia including a light scattering material, wherein the light scattering material is placed under the indicia; and wherein the light scattering material is the same color as the retroreflective sheeting.

2. A license plate comprising the retroreflective article of claim 1.

3. An optical character recognition system, comprising:
an optical character recognition camera;
a light source emitting infra-red light that is coaxial with the optical character recognition camera; and
the retroreflective sheeting of claim 1;
wherein the retroreflective sheeting is irradiated using the light source and imaged using the optical character recognition camera thereby recognizing characters of the indicia.

4. The optical character recognition system of claim 3, wherein the light scattering material is a surface-scattering material.

5. The optical character recognition system of claim 3, wherein the light scattering material is one of an ink, a toner, a dye, and a tape.

6. The optical character recognition system of claim 3, wherein the light scattering material is a surface that has been selectively roughened.

7. The optical character recognition system of claim 3, wherein the light scattering material is one of colored, clear, and white.

8. The optical character recognition system of claim 3, wherein the retroreflective sheeting is disposed on at least a portion of a license plate.

* * * * *